(12) United States Patent
Casper

(10) Patent No.: US 10,517,235 B2
(45) Date of Patent: Dec. 31, 2019

(54) APPARATUS FOR REDUCING PLANT MATERIAL

(71) Applicant: Bandit Industries, Inc., Remus, MI (US)

(72) Inventor: Thomas Edward Casper, Shepherd, MI (US)

(73) Assignee: Bandit Industries, Inc., Remus, MI (US)

( * ) Notice: Subject to any disclaimer, the term of this patent is extended or adjusted under 35 U.S.C. 154(b) by 301 days.

(21) Appl. No.: 15/612,265

(22) Filed: Jun. 2, 2017

(65) Prior Publication Data

US 2017/0347541 A1   Dec. 7, 2017

Related U.S. Application Data

(60) Provisional application No. 62/344,547, filed on Jun. 2, 2016.

(51) Int. Cl.
*A01G 23/06* (2006.01)

(52) U.S. Cl.
CPC .................. *A01G 23/067* (2013.01)

(58) Field of Classification Search
CPC .............. A01G 23/06; A01G 23/067
See application file for complete search history.

(56) References Cited

U.S. PATENT DOCUMENTS

| | | | |
|---|---|---|---|
| 5,313,770 A | 5/1994 | Smothers | |
| 5,499,771 A | 3/1996 | Esposito et al. | |
| 5,845,470 A | 12/1998 | Benway | |
| 6,435,234 B1 * | 8/2002 | Paumier | A01G 23/067 144/24.12 |
| 7,011,124 B1 | 3/2006 | Morey | |
| 8,109,303 B1 | 2/2012 | Holmes | |
| 8,136,435 B2 | 3/2012 | Zhu et al. | |
| 8,584,718 B2 | 11/2013 | Holmes | |
| 9,462,759 B2 * | 10/2016 | Knipp | A01G 23/067 |
| 9,913,436 B2 * | 3/2018 | Miller | A01G 23/067 |
| 2014/0311628 A1 | 10/2014 | Miller | |
| 2017/0027115 A1 | 2/2017 | Holman | |

* cited by examiner

*Primary Examiner* — Matthew Katcoff
(74) *Attorney, Agent, or Firm* — Howard & Howard Attorneys PLLC

(57) ABSTRACT

Embodiments of an apparatus for reducing plant material are disclosed. In one embodiment, the apparatus includes a frame, a boom coupled to and extending from the frame, a drive assembly at least partially coupled to the boom and having a drive shaft rotatable relative to the boom, a hub interconnected to and rotatable with the drive shaft, a cutting wheel interconnected to and rotatable with the hub, and a shearing device coupled to the boom and having a working surface adjacent the hub. The working surface at least partially defines a shearing feature for shearing material wrapped around the hub as the hub rotates.

30 Claims, 12 Drawing Sheets

APPARATUS FOR REDUCING PLANT MATERIAL

CROSS REFERENCE TO RELATED APPLICATIONS

The subject application claims priority to and all the benefits of U.S. Provisional Application No. 62/344,547, filed on Jun. 2, 2016, the contents of which are expressly incorporated herein in their entirety.

FIELD OF THE DISCLOSURE

The present disclosure relates generally to apparatuses for reducing plant material.

BACKGROUND

Apparatuses for reducing plant material, such as a stump grinder, are often used for cutting and/or grinding plant material (such as tree roots, tree stumps, etc.) in the ground for purposes of reducing or removing the plant material from the ground. Many stump grinders include a boom supporting a cutting assembly having a cutting wheel, and rotational motion of the cutting wheel is typically driven by a drive shaft powered by a motor. During operation of the stump grinder, particularly while cutting/grinding the plant material in the ground, the cutting wheel may encounter material such as burlap string, twine, long tree roots, wires, cables, and/or the like. In some instances, the material may wrap around rotational components of the stump grinder as the drive shaft and the cutting wheel rotates. This can adversely affect the rotational movement and/or operation of the cutting wheel, the drive shaft, or both. Where the stump grinder utilizes a hydraulic drive system supported by the boom, material wrapped around the drive shaft could also interfere with the hydraulic drive motor. For example, the material could impose certain angular stresses on the drive shaft that could result in rupturing of a seal formed between the drive shaft and the hydraulic drive motor. Rupturing of the seal could result in undesirable leakage of hydraulic fluid from the motor.

Accordingly, there remains an opportunity to provide an apparatus for reducing plant material that solves the problem(s) identified above.

SUMMARY

In one embodiment of the present disclosure, an apparatus for reducing plant material comprises a frame defining a longitudinal axis, a boom having first and second boom ends with the first boom end coupled to the frame and the boom extending from the frame, a drive assembly at least partially coupled to the second boom end with the drive assembly having a drive shaft supported by the second boom end and rotatable relative to the boom about a rotational axis transverse to the longitudinal axis, a hub interconnected to and rotatable with the drive shaft, a cutting wheel interconnected to and rotatable with the hub about the rotational axis for reducing the plant material as the cutting wheel contacts the plant material, and a shearing device coupled to the second boom end with the shearing device having a working surface adjacent the hub with the working surface at least partially defining a shearing feature for shearing material wrapped around the hub as the hub rotates about the rotational axis.

In another embodiment of the present disclosure, an apparatus for reducing plant material comprises a frame defining a longitudinal axis, a boom having first and second boom ends with the first boom end coupled to the frame and the boom extending from the frame, a drive assembly at least partially coupled to the second boom end with the drive assembly including a drive shaft rotatable relative to the boom about a rotational axis transverse to the longitudinal axis, a cutting wheel coupled to the drive shaft about the rotational axis for reducing the plant material as the cutting wheel contacts the plant material, and a hub interconnected between the cutting wheel and the drive shaft with the hub rotatable with the drive shaft. The hub has a flange abutting the cutting wheel to mount the cutting wheel to the hub and a body portion having a first body end adjacent the flange and a second body end opposite the first body end with the body portion tapered inwardly toward the first body end adjacent the flange relative to the rotational axis, with a diameter of the flange being larger than a diameter of the body portion at the first body end to direct the material toward the cutting wheel.

BRIEF DESCRIPTION OF THE DRAWINGS

The advantages of the present disclosure will be readily appreciated as the same becomes better understood by reference to the following detailed description when considered in connection with the accompanying drawings. It is to be understood that the drawings are purely illustrative and are not necessarily drawn to scale.

DETAILED DESCRIPTION

Referring now to the figures, wherein like numerals indicate corresponding parts throughout the several views, embodiments of an apparatus 10 for reducing plant material are shown in the figures and are described in detail below. In the illustrated embodiments, the apparatus 10 is a stump grinder, which may be used to efficiently and effectively remove or reduce plant material, such as a tree stump 12 or other plant material, from the ground. Alternatively, the apparatus 10 could be any type of cutting and/or grinding apparatus that can suitably cut, grind, or otherwise reduce any type of material, not limited to plant material.

Figure 1:
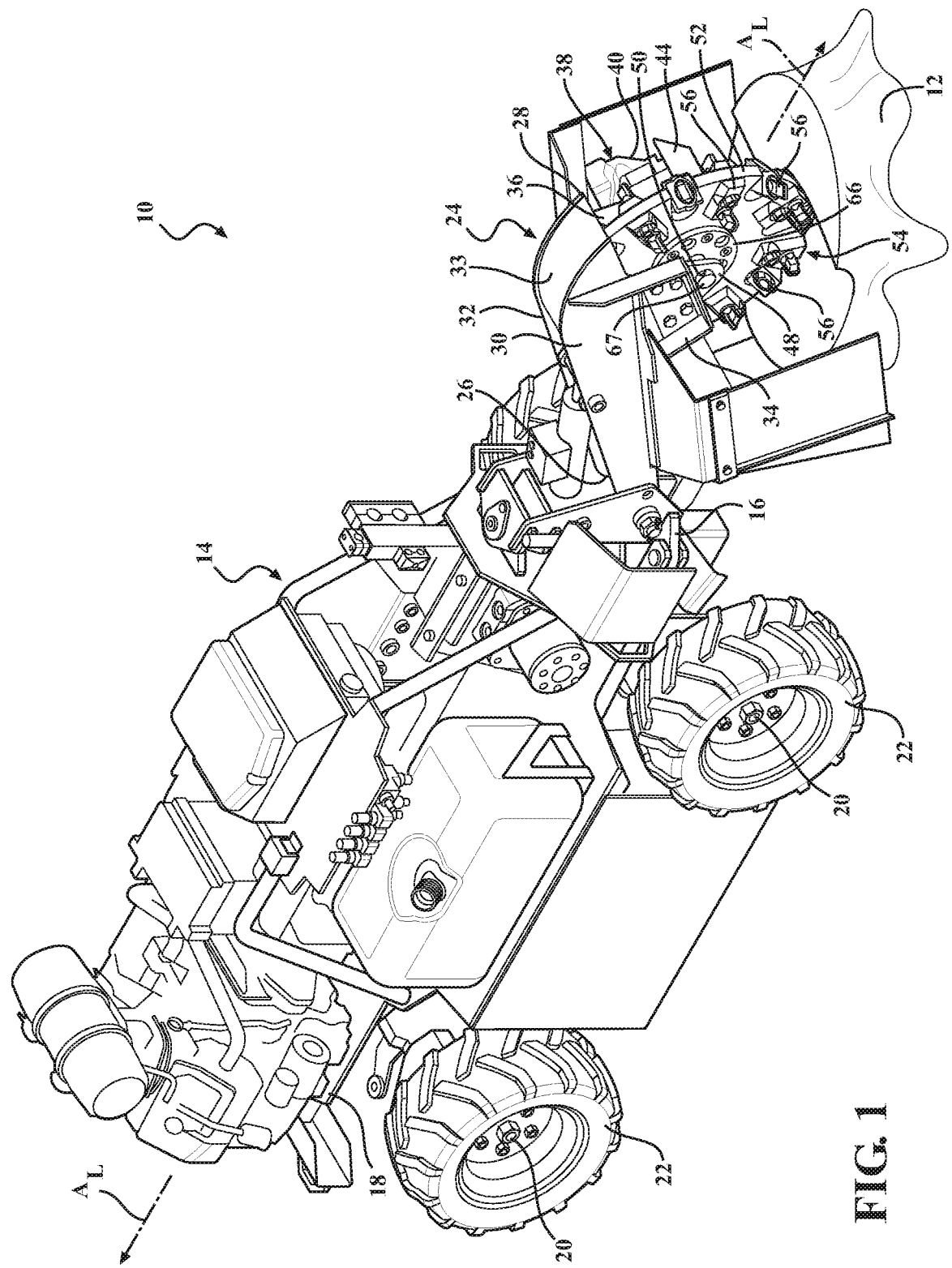
FIG. 1 is a perspective view of an embodiment of an apparatus for reducing plant material.

As shown in FIG. 1, an embodiment of the apparatus 10 includes a frame 14 having front 16 and rear 18 ends and defining a longitudinal axis $A_L$. The frame 14 may have any configuration, and the frame 14 may be formed or constructed from any suitable material or combination of materials. In a non-limiting example, the frame 14 is formed from a metal, such as a steel. In addition, the frame 14 may be formed as a single piece of material, or may be formed of multiple pieces of material joined to one another in any suitable manner. For example, the multiple pieces of material may be metallurgically joined to one another such as with one or more welds, and/or mechanically joined to one another such as with one or more fasteners.

In an embodiment, the apparatus 10 further includes at least one axle 20, with each axle 20 supporting at least one wheel 22. The embodiment of the apparatus 10 illustrated in FIG. 1 has front and rear axles 20, with each axle supporting a pair of wheels 22. The axle(s) 20 and the wheel(s) 22 enable the apparatus 10 to move along the ground from one position to another. In an alternative embodiment, the apparatus 10 could have a plurality of axles supporting a continuous or caterpillar track. In another alternative embodiment, the apparatus 10 is without axles and wheels. In this embodiment, the apparatus 10 would remain stationary when positioned, for example, on the ground.

As shown in FIGS. 1-9, the apparatus 10 has a boom 24 extending from the front end 16 of the frame 14 and having first 26 and second 28 boom ends with the first boom end 26 coupled to the front end 16 of the frame 14. The boom 24 is moveable relative to the frame 14. For example, the first boom end 26 pivots about a pivot point, and second boom end 28 moves relative to the pivot point of the first boom end 26 from the one side to the other and also moves up and down. The boom 24 also has first 30 and second 32 walls spaced from one another and a top portion 33 extending between the walls 30, 32. Each of the first 30 and second 32 walls extend between the first 26 and second 28 boom ends, and the walls 30, 32 are substantially parallel to one another.

The boom 24 further includes a first bracket 34 coupled to and extending from the first wall 30, and a second bracket 36 coupled to and extending from the second wall 32. The brackets 34, 36 can have any suitable configuration. In the embodiment shown, the configuration of the first bracket 34 is different from the configuration of the second bracket 36. Further details of the brackets 34, 36 are described below.

Figure 6:
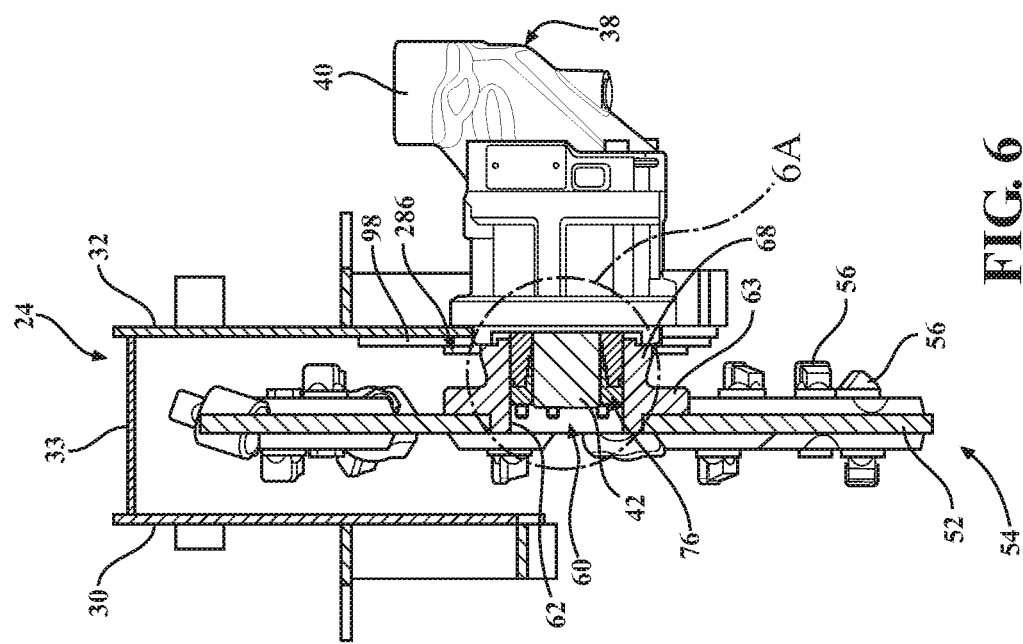
FIG. 6 is a cross-sectional view of the portion of the apparatus of FIG. 1 taken along line 6-6 in FIG. 5.
Figure 5:
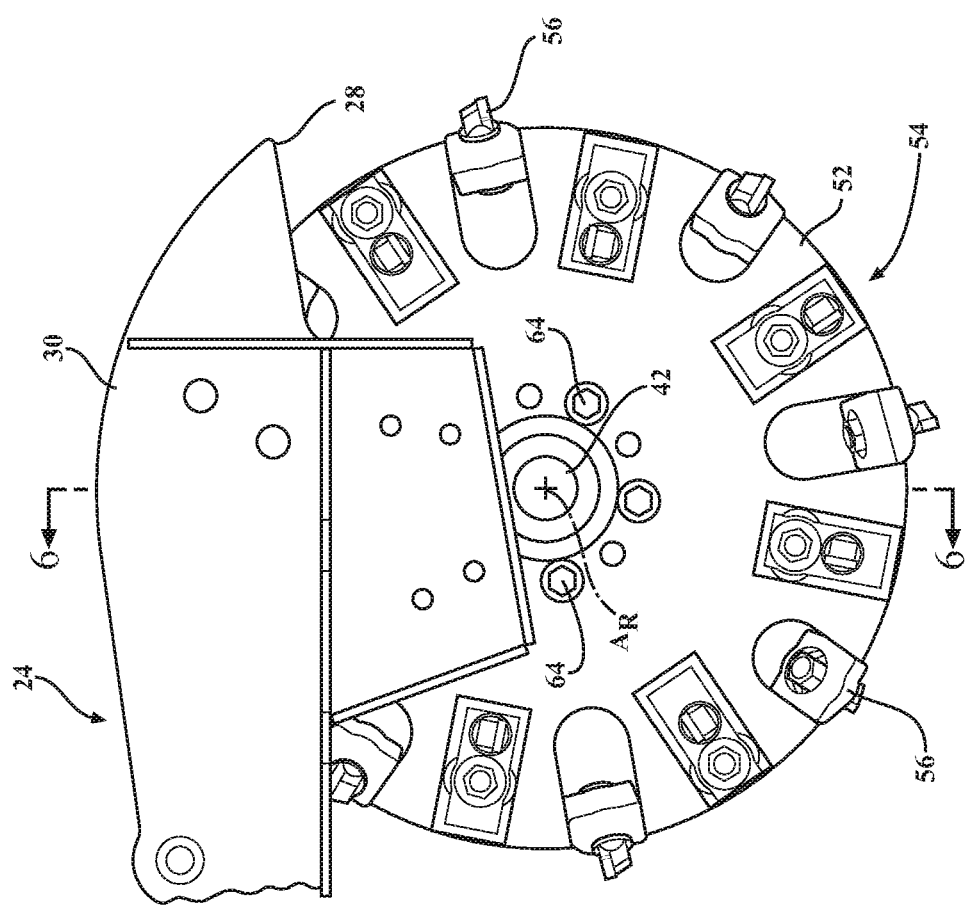
FIG. 5 is a side view of a portion of the apparatus of FIG. 1. Notably, the catch, plate, and stub shaft of the apparatus have been removed for purposes of simplifying the drawing.
Figure 6A:
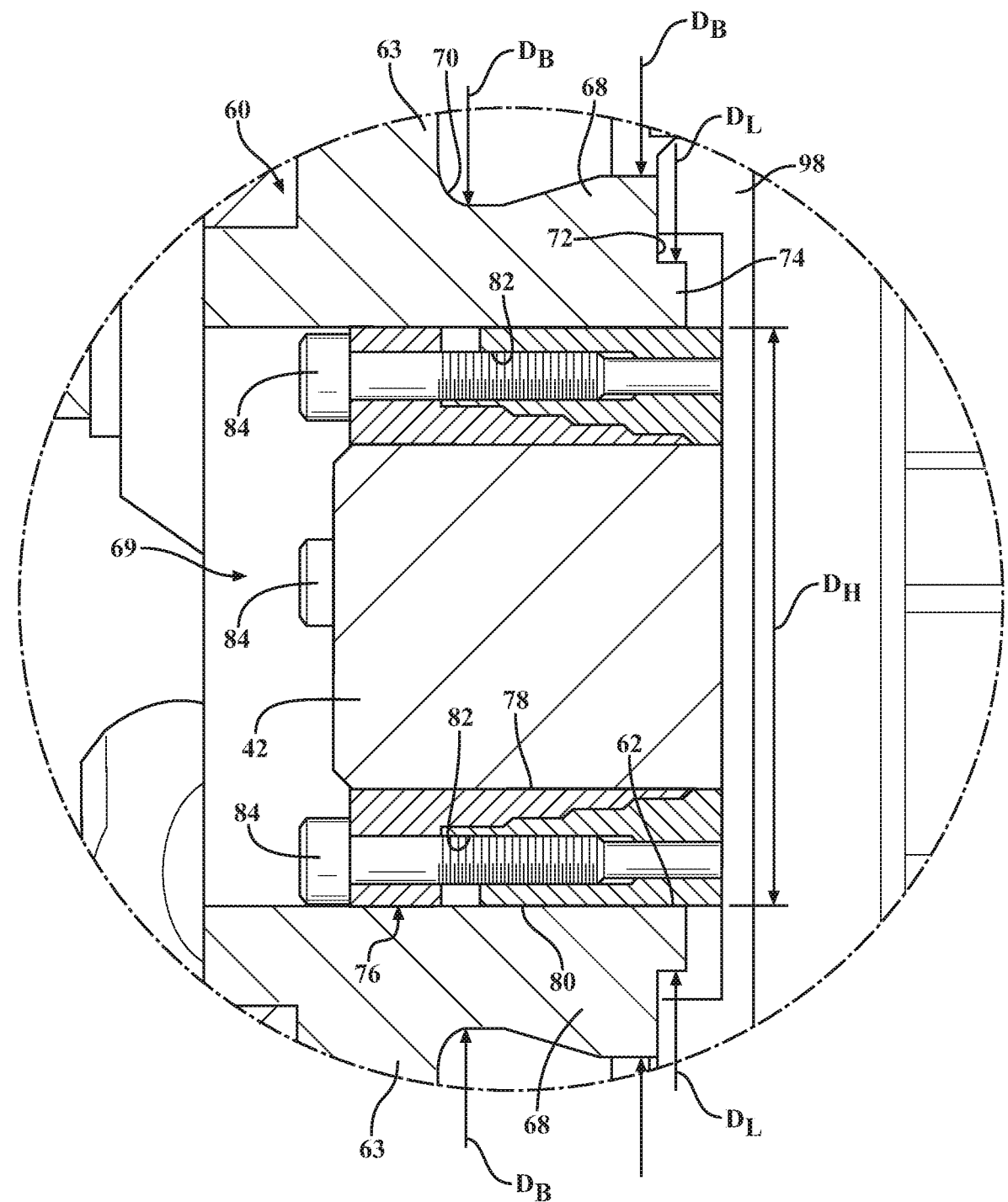
FIG. 6A is an enlarged view of a portion of the apparatus shown in FIG. 6.
Figure 7:
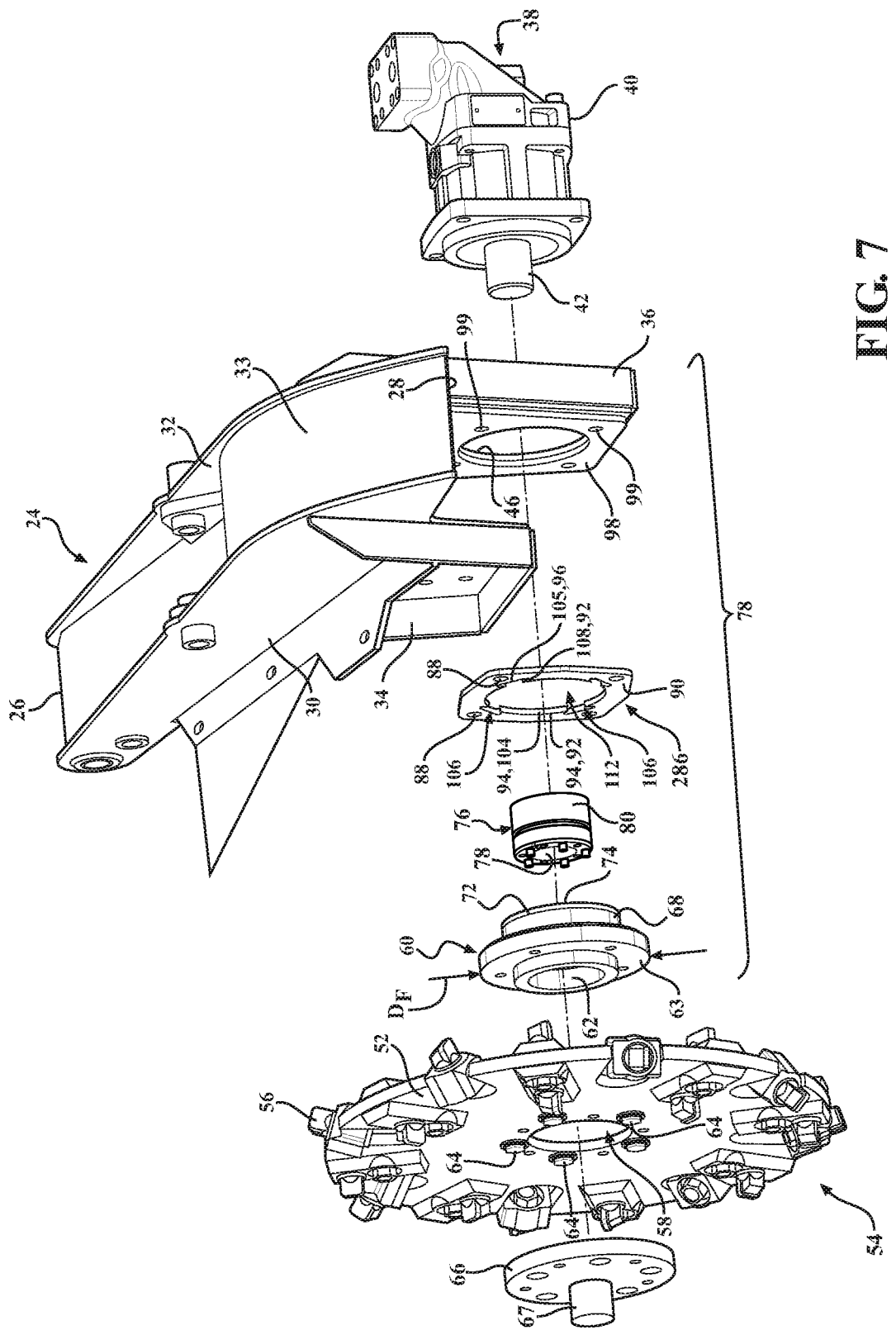
FIG. 7 is an exploded perspective view of a portion of the apparatus of FIG. 1.

As shown in FIGS. 1-4 and 6-8, the apparatus 10 further includes a drive assembly 38 at least partially coupled to the second boom end 28. The drive assembly 38 has a drive shaft 42 supported by the second boom end 28 and rotatable relative to the boom 24 about a rotational axis $A_R$ transverse to the longitudinal axis $A_L$. The drive assembly 38 further has a motor 40 to power the drive shaft 42. In the illustrated embodiment, the drive assembly 38 has a hydraulic drive system including a hydraulic drive motor as the motor 40 and the drive shaft 42 is directly connected to and powered by the hydraulic drive motor 40. The hydraulic drive motor 40 is coupled to and supported by the boom 24. For example, and as shown at least in FIGS. 3 and 4, the bracket 36 may have a support 44, and the hydraulic drive motor 40 is positioned within and/or supported by the support 44. In addition, the motor 40 may be directly attached to the second bracket 36 with at least one fastener. As shown in FIG. 7, the second bracket 36 defines an aperture 46, and the drive shaft 42 extends from the hydraulic drive motor 40 and through the aperture 46.

Alternatively, the drive assembly 38 could have any suitable drive system including, but not limited to, belt driven systems, power-take-off (PTO) systems, chain drive systems, and/or the like. In one or more of these alternative drive systems, the motor 40 could be coupled to and/or supported by the frame 14 rather than the boom 24. Further, the motor 40 coupled to the boom 24 could be an electric motor.

The apparatus 10 further has a cutting assembly 54 including the cutting wheel 52. The cutting wheel 52 is coupled to the drive shaft 42 about the rotational axis $A_R$, and is adapted to rotate about the rotational axis $A_R$ relative to the boom 24. The cutting wheel 52 has a plurality of cutting elements 56 and while rotating, the cutting wheel 52 utilizes the cutting elements 56 to cut, grind, or otherwise reduce the plant material, such as the tree stump 12, when the cutting wheel 46 (and the cutting elements 56) contacts the plant material in the ground.

As shown in FIGS. 3, 4, and 6-9, the apparatus 10 further has a hub 60 interconnected between the cutting wheel 52 and the drive shaft 42 with the hub 60 rotatable with the drive shaft 42. As shown in FIGS. 6-7, the hub 60 has an inner hub surface 62. The inner hub surface 62 has an inner hub diameter $D_H$. The hub 60 further has a flange 63 abutting the cutting wheel 52 to mount the cutting wheel 52 to the hub 60. The cutting wheel 52 may be mounted to the hub 60 utilizing any suitable mounting feature or combination(s) of features. In the embodiment shown, the cutting wheel 52 is mounted to the hub 60 with a plurality of fasteners 64 disposed through aligned apertures defined in the cutting wheel 52 and the flange 63 of the hub 60.

The hub 60 further has a body portion 68 having a first body end 70 adjacent the flange 63 and a second body end 72 opposite the first body end 70. In an embodiment, the flange 63 is integral with the body portion 68, with the flange 63 and the body portion 68 collectively defining the inner hub surface 62. The inner hub surface 62 defines a hub opening 69. In addition, the flange 63 has an outer diameter $D_F$ and the body portion 68 has an outer diameter $D_B$. As shown at least in FIGS. 6-8, the body portion 68 is tapered inwardly toward the first body end 70 adjacent the flange 63 relative to the rotational axis $A_R$, with the diameter $D_F$ of the flange 63 being larger than the diameter $D_B$ of the body portion 68 at the first body end 70. In an embodiment, the flange 63 and the body portion 68 form an angle of less than 90 degrees.

In an embodiment, the hub 60 further has a lip 74 extending from the second body end 72 of the body portion 68 along the rotational axis $A_R$. As shown at least in FIG. 8, the lip 74 has an outer diameter $D_L$ that is smaller than the outer diameter $D_B$ of the body portion 68 at the second body end 72. Alternatively, the lip 74 could have substantially the same outer diameter as the outer diameter of the body portion 68 at the second body end 72. In another alternative embodiment, the hub 60 may not have a lip 74, and the hub 60 would terminate at the second body end 72.

Figure 8:
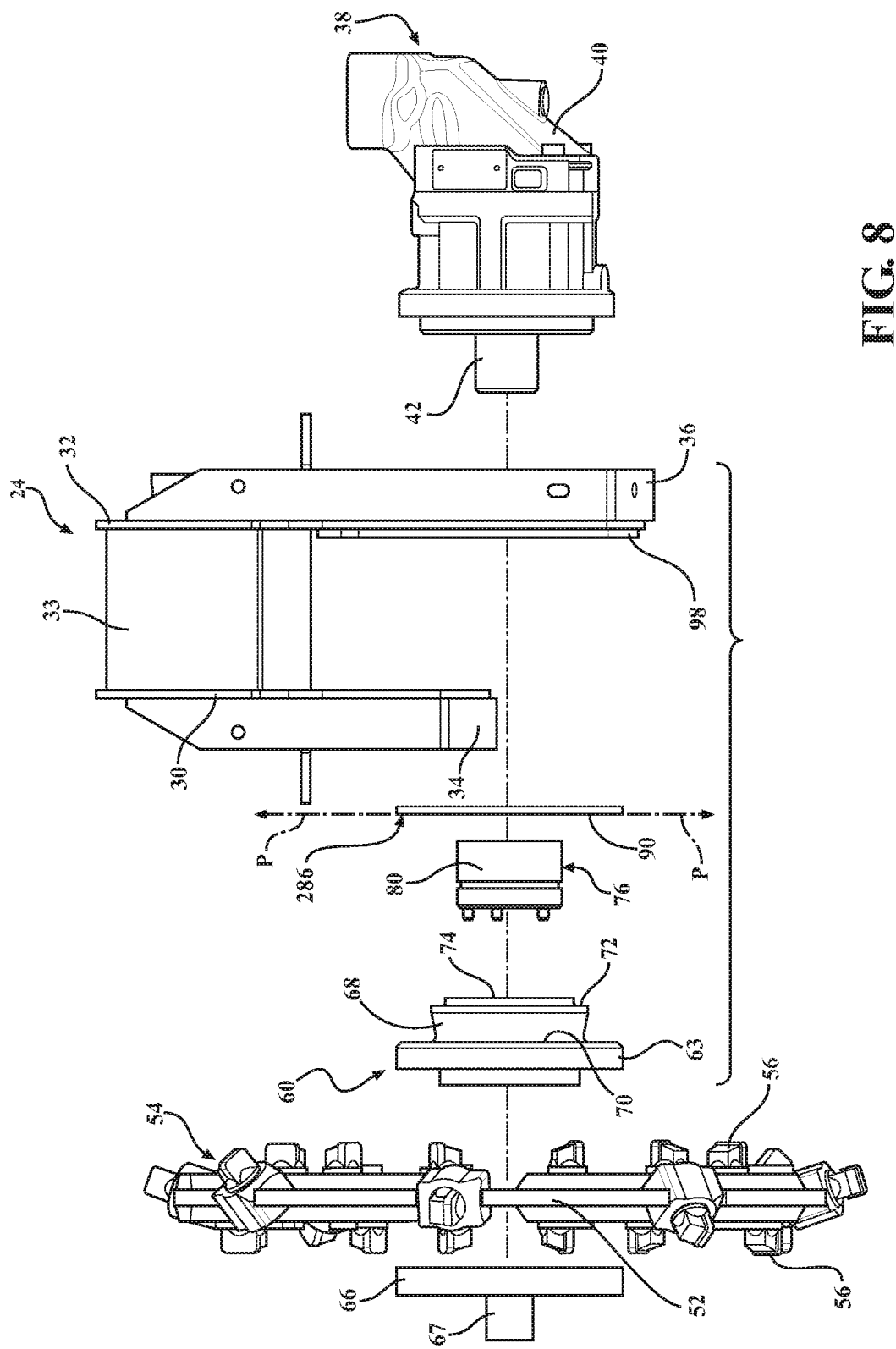
FIG. 8 is an exploded front end view of a portion of the apparatus of FIG. 1.
Figure 9:
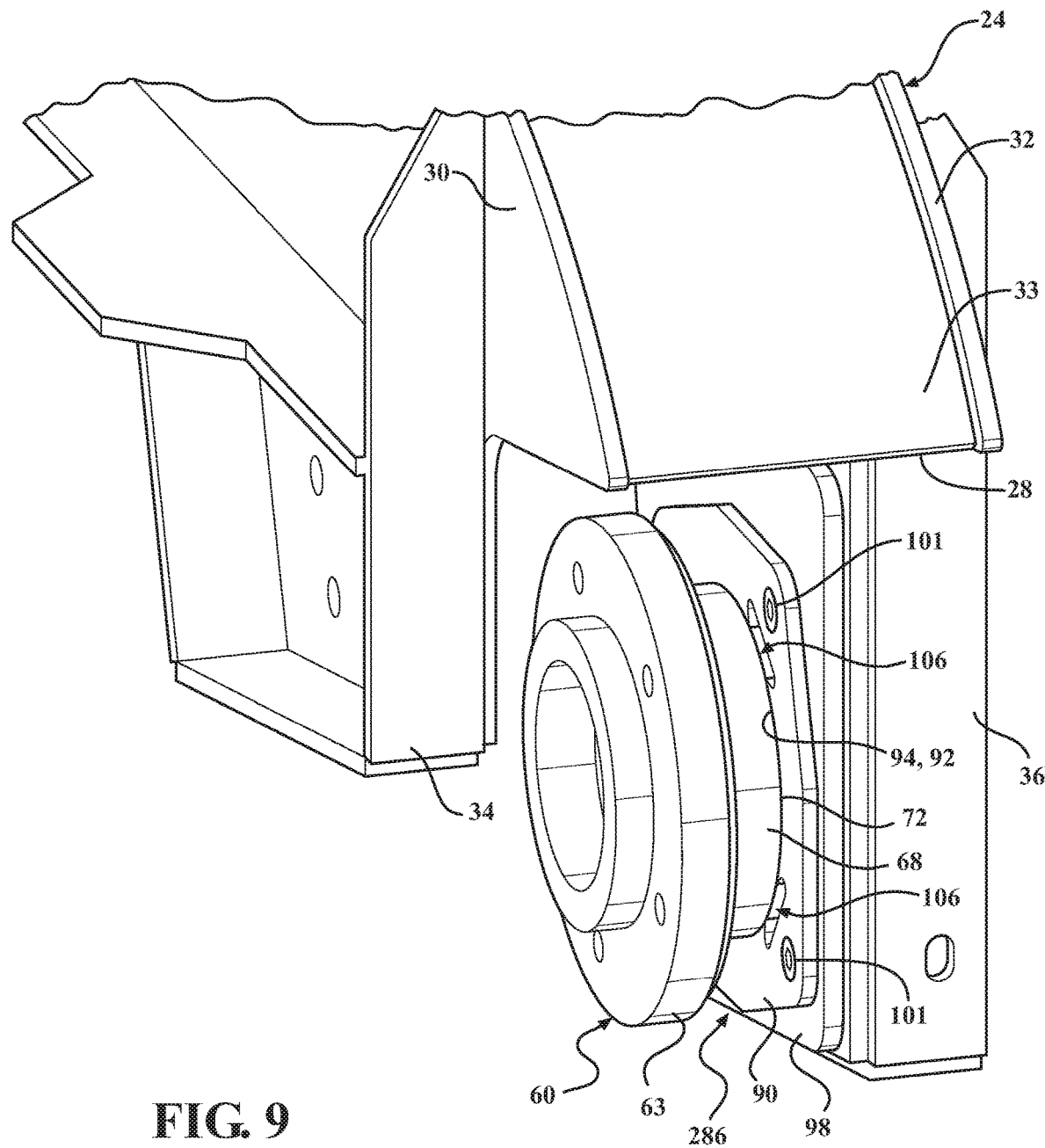
FIG. 9 is a perspective, right side view of a portion of the apparatus of FIG. 1.

As shown in FIGS. 6-8, the apparatus 10 further has a coupler 76 disposed between the hub 60 and the drive shaft 42 and operable to interconnect the hub 60 and the drive shaft 42. The coupler 76 has inner 78 and outer 80 coupler surfaces, and the coupler 76 is disposed within the body opening 69 such that the inner coupler surface 78 is disposed over and engages the drive shaft 42 and the outer coupler surface 80 engages the inner hub surface 62. As shown, the coupler 76 defines a plurality of coupler apertures 82 and further has a plurality of fasteners 84 disposed within the coupler apertures 82. The coupler 76 expands inwardly upon tightening the fasteners 84 so that the inner coupler surface 78 engages the drive shaft 42. The coupler 76 also expands outwardly upon tightening the fasteners 84 so that the outer coupler surface 80 engages the inner hub surface of the hub 60. In this way, the coupler 76 operates to securely interconnect the drive shaft 42 and the hub 60. It is to be appreciated that the hub 60 could be connected to the drive shaft 42 in another suitable manner.

In alternative embodiment, the apparatus 10 could have first and second hubs, with the first hub disposed at one side of the cutting wheel 52 and the second hub disposed at the other side of the cutting wheel 52.

Since the hub 60 is interconnected with the drive shaft 42, the hub 60 rotates with the drive shaft 42 as the drive shaft 42 rotates about the rotational axis $A_R$. Since the hub 60 is also interconnected with the cutting wheel 52, the cutting wheel 52 rotates with the hub 60 and the drive shaft 42 as the drive shaft 42 rotates about the rotational axis $A_R$. With reference to at least FIG. 7, the cutting wheel 52 further defines an opening 58 proximate the center of the cutting wheel 52, and the apparatus 10 further has a plate 66 coupled to the cutting wheel 52 surrounding the opening 58 of the cutting wheel 52 and a stub shaft 67 extending from the plate 66. In an embodiment, the stub shaft 67 is welded to the plate 66. In addition, the stub shaft 67 is aligned with the drive shaft 42 and extends along the rotational axis $A_R$.

Figure 2:
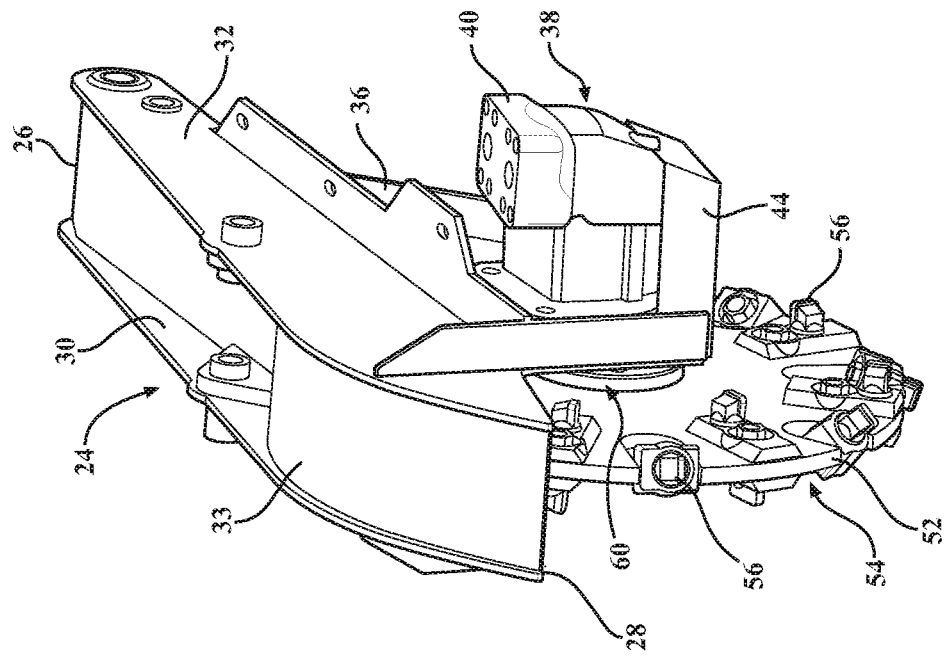
FIG. 2 is a perspective, right side view of a portion of the apparatus of FIG. 1.
Figure 3:
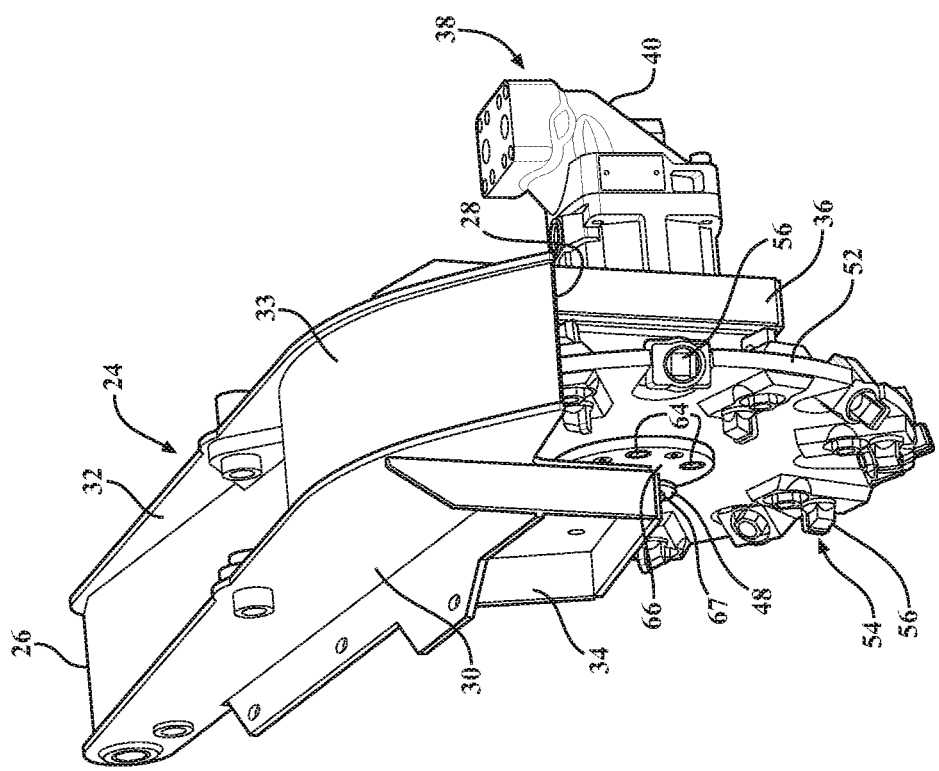
FIG. 3 is a perspective, left side view of a portion of the apparatus of FIG. 1.
Figure 4:
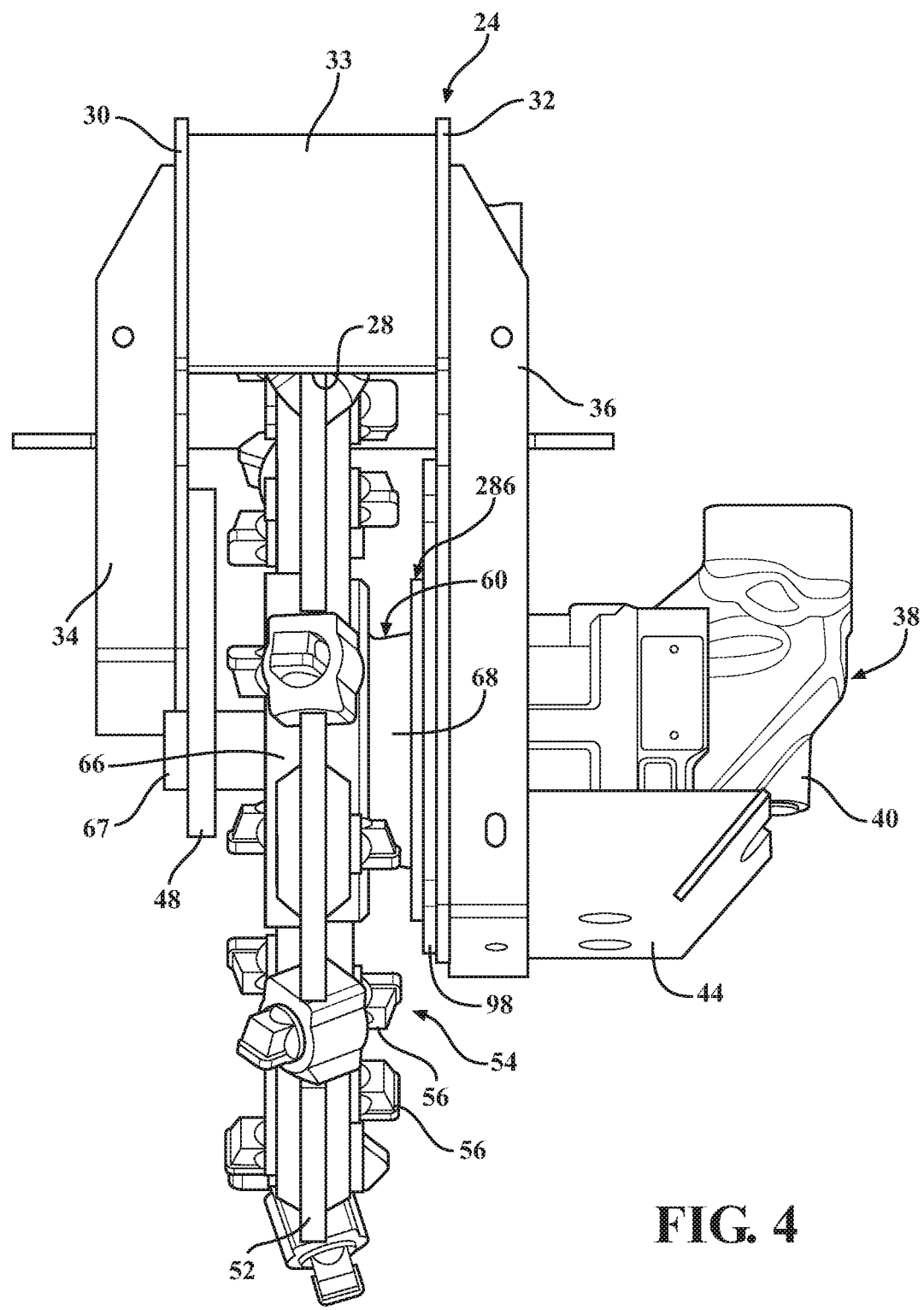
FIG. 4 is a front end view of a portion of the apparatus of FIG. 1.

As shown in FIGS. 1, 2, and 4, the apparatus 10 further has a catch 48 coupled to the first wall 30 of the boom 24 adjacent the first bracket 34. The catch 48 defines an opening 50, and the stub shaft 67 extends through the opening 50. The opening 50 is typically larger in diameter than the outer diameter of the stub shaft 67 such that a space or tolerance is formed between the catch 48 and the stub shaft 67. In instances where the stub shaft 67 breaks or detaches from the cutting wheel 52, the catch 48 operates to catch or capture the stub shaft 67 such that the cutting wheel 52 does not detach and/or fly off while rotating.

In an alternative embodiment, the drive shaft 42 could be configured to extend through the hub opening 69, through the opening 58 of the cutting wheel 52, and through the opening 50 of the catch 48. In this alternative embodiment, the catch 48 would operate to catch or capture the drive shaft 42 if the drive shaft 42 breaks such that the cutting wheel 52 does not detach or fly off while rotating.

In another alternative embodiment, the plate 66, the stub shaft 67, and catch 48 may not be required. In this alternative embodiment, the cutting wheel 52 would be cantilevered from the drive shaft 42.

During operation of the apparatus 10, material such as string, tree roots, twine, etc. can wind around the body portion 68 of the hub 60. Since the body portion 68 is tapered inwardly toward the cutting wheel 52, the material collects around the body portion 68 typically toward or proximate the first body end 70 of the hub 60 adjacent the flange 63. By collecting the material around the body portion 68 proximate the first body end 70, the hub 60 substantially prevents the material from getting entangled with and adversely affecting the operation of the drive shaft 42. This, in effect, could interfere with the hydraulic drive motor 40 coupled to the second boom end 28.

The apparatus 10 further has a shearing device 86, 186, 286 coupled to the second boom end 72 and adapted to minimize interference of the material with the motor 40. The apparatus 10 shown in FIGS. 6-9 utilizes an embodiment of the shearing device 286. As shown, the shearing device 286 is directly connected to an insert 98, which can be directly connected to the second bracket 36. The shearing device 286 defines a plurality of apertures 88. The apertures 88 of the shearing device 286 are aligned with apertures 99 of the insert 98, which are aligned with apertures defined in the second bracket 36. The shearing device 286 is connected to the insert 98 and to the second bracket 36 with a plurality of fasteners 101 disposed through the aligned apertures 88, 99. It is to be appreciated that the shearing device 286 may be attached or connected to the second bracket 36 in any suitable manner, and with one or more other mechanical features.

Embodiments of the shearing device 86, 186, 286 are described in detail below with reference to FIGS. 10-17. It is to be appreciated that the configuration of the various embodiments of the shearing device 86, 186, 286 is not limited to the configurations specifically shown in the figures. It is further to be appreciated that alternative configurations of the shearing device 86, 186, 286 not specifically illustrated in the figures or mentioned in the description below are also contemplated herein. In addition, various features of one of the embodiments of the shearing device 86, 186, 286 could be used for one or more of the other embodiments of the shearing device 86, 186, 286.

Figure 11:
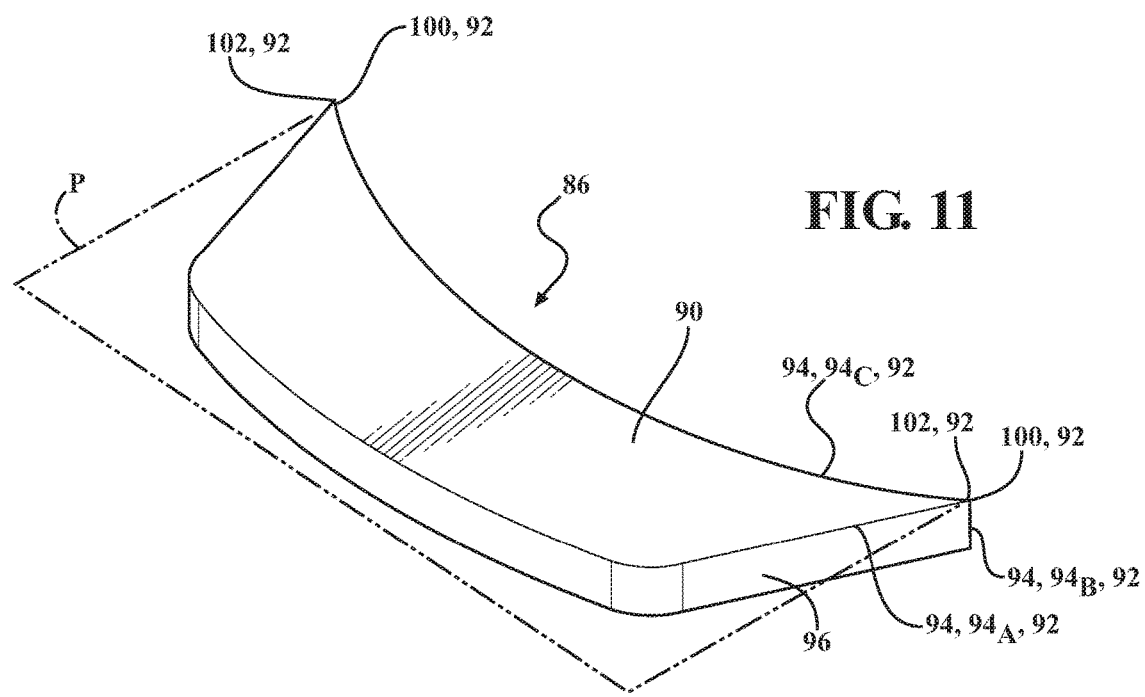
FIG. 11 is a perspective, top view of the shearing device of FIG. 10.

Each of the embodiments of the shearing device 86, 186, 286 has a working surface 90, and the shearing device 86, 186, 286 is positioned such that the working surface 90 is adjacent the hub 60. The working surface 90 also defines a plane P (as shown in FIGS. 8 and 11, for example), and the working surface 90 at least partially defines a shearing feature 92. The shearing feature 92 is configured to shear material (such as tree roots, twine, etc.) wrapped around the hub 60 and extending toward or beyond the second body end 72 as the hub 60 rotates about the rotational axis $A_R$. By shearing the material, the shearing feature 92 of the shearing device 86 essentially reduces or even prevents the material from getting wrapped around, entangled with, and/or hindering the operability of the drive shaft 42 and/or motor 40.

In each of the embodiments, the shearing device 86, 186, 286 has an edge 94 and the shearing feature 92 is further defined as the edge 94. The shearing device 86, 186, 286 further has a side 96 transverse to the working surface 90 with the side 96 and the working surface 90 meeting to form the edge 94. In an embodiment, the edge 94 is aligned with the plane P of the working surface 90. Depending, at least in part, on the configuration, the shearing device 86, 186, 286 may have one, two, three, or more edges 94 (such as edges $94_A$ and $94_B$) aligned with the plane P. In the embodiment illustrated in FIGS. 10-12, for example, the shearing device 86 has at least three edges 94 aligned with the plane P. At least a portion of each of these edges 94 can operate as the shearing feature 92 to shear material wrapped around the hub 60 that contacts with the shearing device 86 while the hub 60 is rotating about the rotational axis $A_R$.

The shearing device 86, 186, 286 also has a plurality of sides 96 transverse to the working surface 90 with one of the plurality of sides 96 meeting another one of the plurality of sides 86 to define an edge 94 at an apex. In an embodiment, the plurality of sides 96 meet at an apex having an angle of less than 90°. The shearing feature 92 is further defined as the edge 94 at the apex formed by the meeting of the two sides 96 of the shearing device 86, 186, 286.

The edge 94 at the apex of the two sides 96 is transverse to the plane P of the working surface 90. For example, and in the embodiment shown in FIG. 11, the edge 94 (such as edge $94_C$) at the apex of the two sides 96 is substantially perpendicular to the plane P of the working surface 90. Depending, at least in part, on the configuration, the shearing device 86 may have one, two, three, or more edges 94 at an apex defined by one of the sides 96 meeting another one of the sides 96. In the embodiment shown in FIGS. 10-12, the shearing device 86 has three sides 96, with two of the sides 96 meeting to form a first edge at an apex and another two of the sides 96 meeting to form a second edge 94 at an apex. Accordingly, in this embodiment, the shearing device 86 has two edges 94 at an apex from the meeting of the sides 96. In addition, at least a portion of the edges 94 at the apex of the sides 96 can operate as the shearing feature 92 to shear material wrapped around the hub 60 that contacts with the shearing device 86 while the hub 60 is rotating about the rotational axis $A_R$.

As previously mentioned, the shearing device 86 has at least one edge 94. In the embodiment shown in FIGS. 10-12, the shearing device 86 has a plurality of edges 94, with one of the edges 94 being further defined as a first edge $94_A$ aligned with the plane P of the working surface 90 and another one of the edges 94 being further defined as a second edge $94_B$ transverse to the plane P of the working surface 90. The shearing feature 92 may be defined as at least one of the first edge $94_A$ and the second edge $94_B$. As shown, the first $94_A$ and second $94_B$ edges meet to form an apex 100, and the shearing feature 92 is further defined as at least one of the first edge $94_A$, the second edge $94_B$, and the apex 100.

Figure 10:
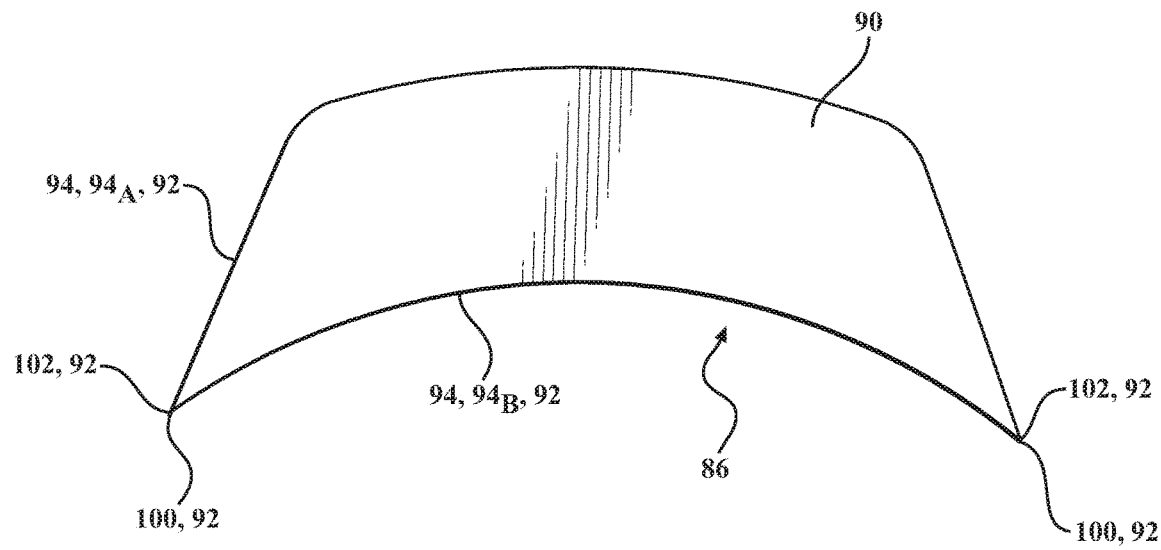
FIG. 10 is an enlarged plan view of an embodiment of a shearing device of the apparatus of FIG. 1.
Figure 12:
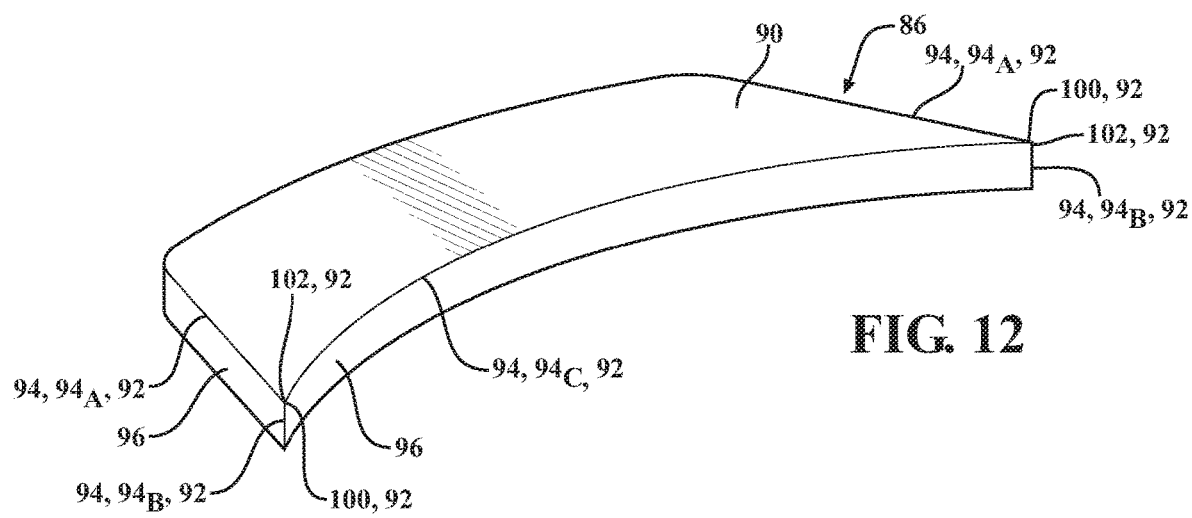
FIG. 12 is a side view of the shearing device of FIG. 10.

Additionally, and as shown in the embodiment depicted in FIGS. 10-12, the plurality of edges 94 further includes a third edge $94_C$. The first $94_A$ and third $94_C$ edges are both aligned with the plane P of the working surface 90 and meet to form an apex 102. In the embodiment shown, the apex 102 is located at the same position as the apex 100. The shearing feature 92 is further defined as at least one of the first edge $94_A$, the third edge $94_C$, and the apex 102.

Figure 13:
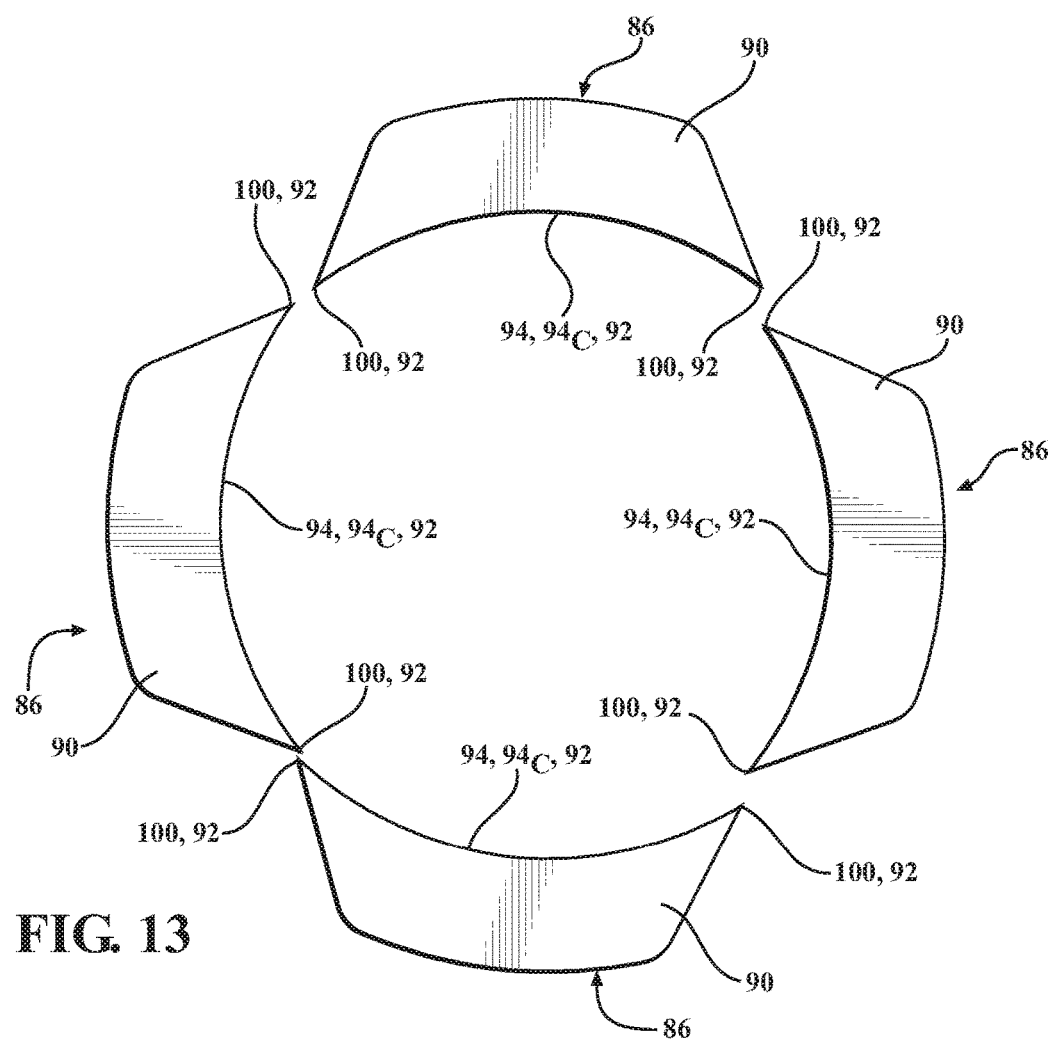
FIG. 13 illustrates an arrangement of a plurality of a shearing devices for the apparatus of FIG. 1.

The apparatus 10 may include a single sheering device 86, or may include a plurality of shearing devices 86. In instances where the apparatus 10 includes a plurality of shearing devices 86, the shearing devices 86 may be arranged in a particular pattern and coupled to the second boom end 28. In one embodiment, and as shown in FIG. 13, the plurality of shearing devices 86 may be arranged in a circular pattern about the rotational axis $A_R$. In this embodiment, each of the shearing devices 86 defines at least one edge 94, with the at least one edge 94 of one of the plurality of shearing devices 86 being spaced from the at least one edge 94 of another one of the plurality of shearing devices 86. Said differently, the edge 94 of one of the shearing devices 86 does not touch or contact the edge 94 of another one of the shearing devices 86. To this end, the shearing feature 92 is further defined as a combination of the edges 94. For example, the shearing feature 92 may be defined as a combination of one of the edges 94 of one of the shearing devices 86 and one of the edges 94 of an adjacent one of the shearing devices 86.

In the embodiment shown in FIG. 13, the plurality of shearing devices 86 includes four shearing devices 86 arranged in the circular pattern about the rotational axis $A_R$. It is to be appreciated that the plurality of shearing devices 86 can include any number of shearing devices 86, such as two shearing devices 86, three shearing devices 86, four shearing devices 86, five shearing devices 86, and so on. In addition, the shearing devices 86 can be arranged in any desirable pattern, not limited to a circular pattern. For example, the shearing devices 86 could be arranged in a square pattern, in a triangular pattern, in a line, and/or other desirable patterns or arrangements. Typically, in any of the alternative arrangements or patterns, the shearing devices 86 would be spaced from one another. It is to be appreciated that the shearing devices 86 could be arranged such that two or more of the shearing devices 86 contact one another.

Figure 14:
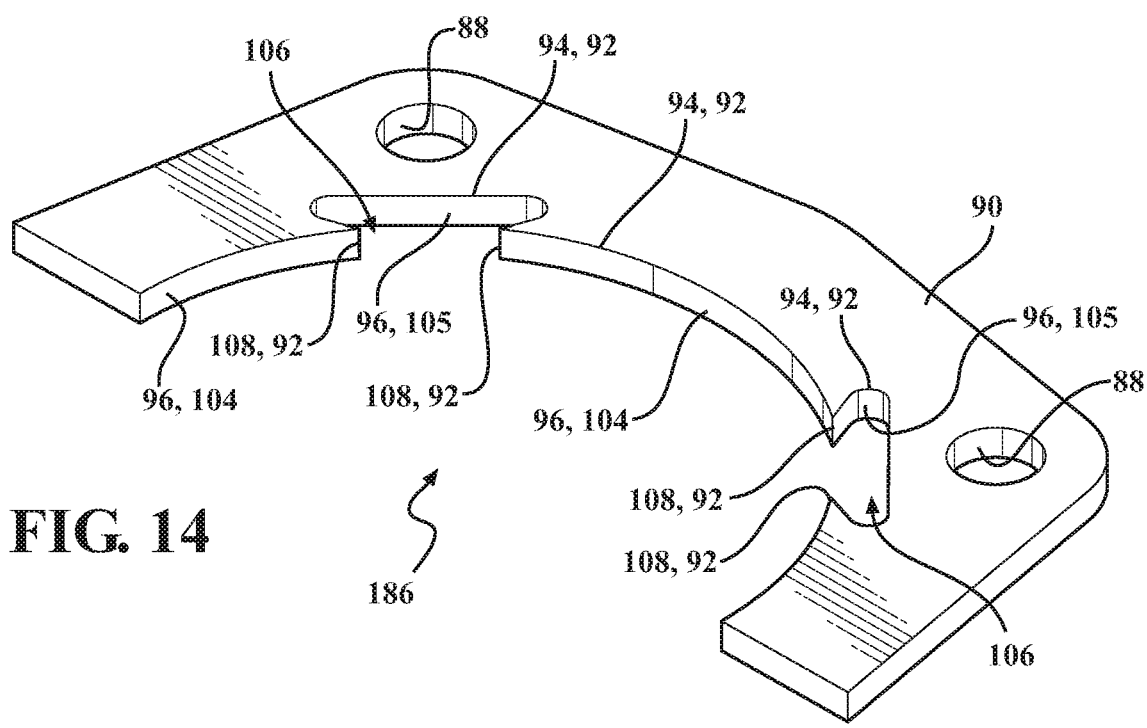
FIG. 14 is a perspective, top view of another embodiment of the shearing device.
Figure 15:
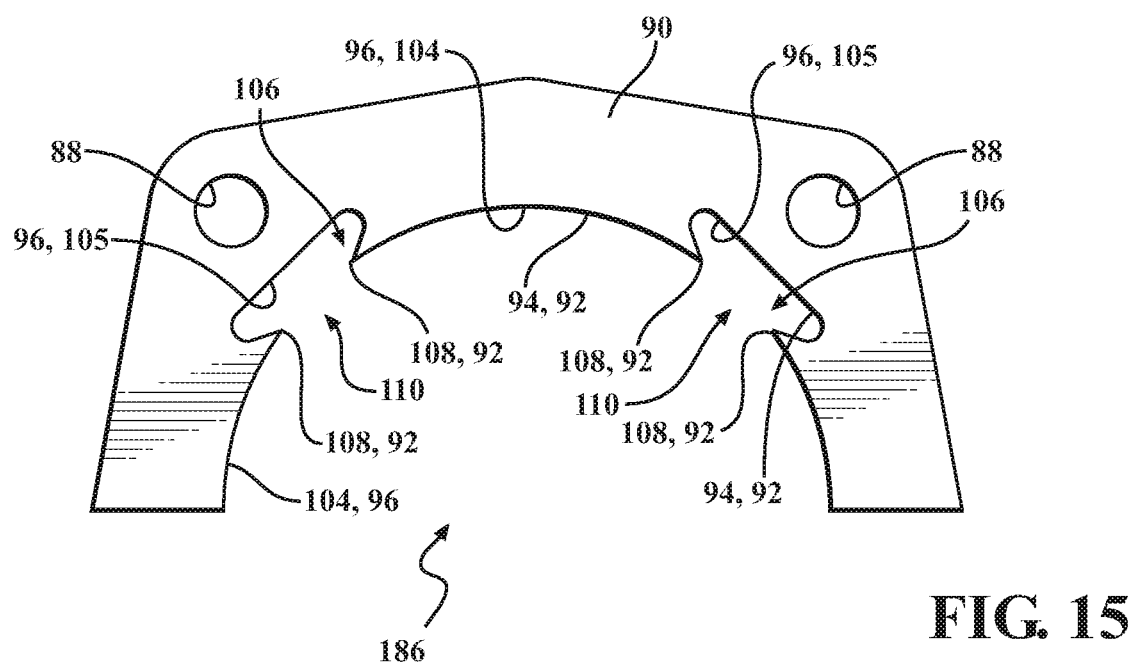
FIG. 15 is a plan view of the shearing device of FIG. 14.
Figure 16:
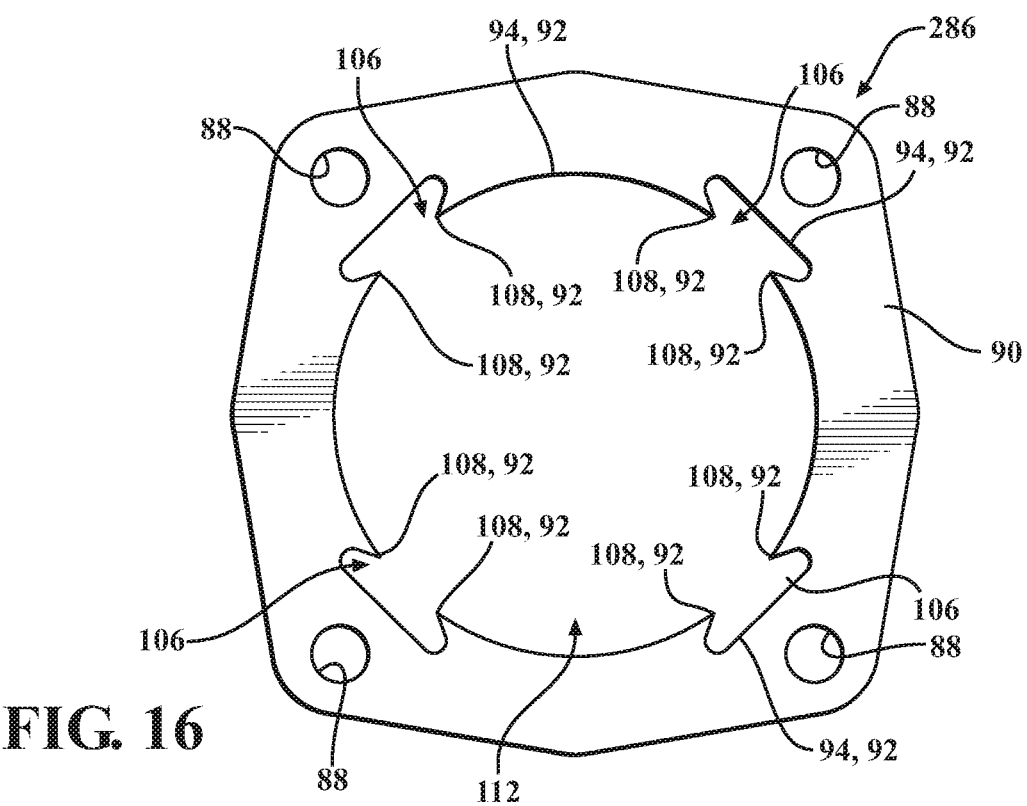
FIG. 16 is a plan view of another embodiment of the shearing device.

Another embodiment of the shearing device 186 is illustrated in FIGS. 14 and 15. In this embodiment, the shearing device 186 has a side 96 transverse to the working surface 90 with the side 96 having a primary side portion 104 and at least one secondary side portion 105. The at least one secondary side portion 105 defines a cavity 106. In the embodiment shown, the shearing device 186 has two cavities 106. However, the shearing device 186 could have any number of cavities 106. In addition, each of the cavities 106 has a round configuration. It is to be appreciated that the cavities 106 can have any configuration, such as a rectangular configuration, a square configuration, a triangular configuration, etc. Each of the cavities 106 may also have any size. In the embodiment shown, the cavities 106 have a similar configuration. Alternatively, the configuration of one of the cavities 106 could be different from the configuration of the other cavity 106.

As shown in FIG. 14, the primary side portion 104 of the shearing device 186 meets the secondary side portion 105 to form an apex 108. The shearing feature 92 of the shearing device 186 is further defined as at least one of the primary side portion 104, the secondary side portion 105, and the apex 108. In the embodiment shown, the shearing device 186 has four apexes 108, with two apexes 108 formed by the meeting of the primary side portion 104 and the secondary side portion 105 at the mouth 110 of each of the cavities 106.

Still another embodiment of the shearing device 286 is described below with reference to FIGS. 7, 8, 9, 16, and 17. The shearing device 286 is similar to the shearing device 186, except that the shearing device 286 defines an aperture 112. The aperture 112 may have any suitable configuration and/or size. In the embodiment shown, the aperture 112 has a substantially circular configuration. For example, the shearing device 286 has a side 96 transverse to the working surface 90 defining the aperture 112 with the side 96 having a primary side portion 104 and at least one secondary side portion 105. The secondary side portion(s) 105 defines a cavity 106 open to the aperture 112. As shown, the cavity 106 has a rounded configuration. It is to be appreciated that the cavity 106 can have any suitable configuration, such as a rectangular configuration, a square configuration, a triangular configuration, etc. Additionally, the cavity 106 may have any desirable size. As shown, the primary side portion 104 meets the secondary side portion 105 to form an apex 108. The shearing feature 92 of the shearing device 286 is further defined as at least one of the primary side portion 104, the secondary side portion 105, and the apex 108.

In the present embodiment, the shearing device 286 has a plurality of cavities 106 with each one of the cavities 106 equally spaced from an adjacent one of the cavities 106. In an alternative embodiment, the cavities 106 could be spaced differently from one another. For example, one pair of adjacent cavities 106 could be spaced a first distance from one another and another pair of adjacent cavities 106 could be spaced a second distance from one another, where the first and second distances are different. In addition, each of the cavities 106 has substantially the same configuration. Alternatively, one or more of the cavities 106 could have a configuration that is different from one more of the other cavities 106.

Figure 17:
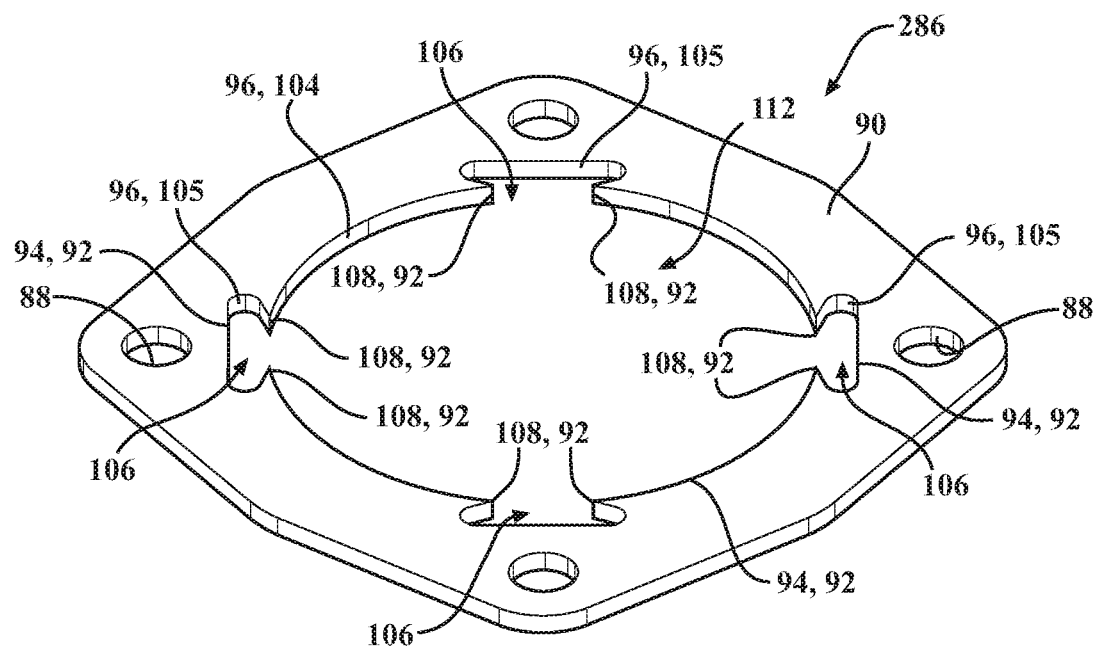
FIG. 17 is a perspective, top view of the shearing device of FIG. 16.

As shown at least in FIG. 17, the primary side portion 104 of the shearing device 286 meets the secondary side portion 105 to form an apex 108. The shearing feature 92 of the shearing device 286 is further defined as at least one of the primary side portion 104, the secondary side portion 105, and the apex 108. In the embodiment shown, the shearing device 286 has eight apexes 108, with two apexes 108 formed by the meeting of the primary side portion 104 and the secondary side portion 105 at the mouth 110 of each of the cavities 106.

In an embodiment, one or more of the edges 94 and/or one or more of the apexes 108 of the shearing device 86, 186, 286 could protrude slightly outward to form one or more small knife-like structures. For example, each of the apexes 108 could protrude slightly in a direction transverse to the plane P of the working surface 90 of the shearing device 86, 186, 286, such as outwardly toward the hub 60. In another embodiment, one or more of the edges 94 and/or one or more of the apexes 108 could cave in to form one or more small divots. The small knife-life structures and/or small divots can assist with shearing or nicking of the material wrapped around the body portion 68 of the hub 60 while rotating with the drive shaft 42 about the rotational axis $A_R$.

Cutting, grinding, or otherwise reducing the plant material in the ground utilizing the apparatus 10 may be accomplished as follows. The apparatus 10 may be oriented so that the cutting wheel 52 can directly contact the plant material, such as the tree stump 12, as shown in the example set forth in FIG. 1. The operation of the apparatus 10 may be controlled by an operator, for example, to enable the cutting wheel 52 to effectively and efficiently cut and/or grind the plant material, causing the eventual reduction of the plant material from the ground. Control of the operation of the apparatus 10 may be accomplished by controlling (or adjusting) movement of the apparatus 10, boom 24, etc. In an embodiment, the apparatus 10 further has suitable control elements for enabling the operator to control the operation of the apparatus 10.

Upon contacting the plant material in the ground, the cutting wheel 52 may come into contact with certain material such as string (such as from burlap wrapped around a plant, shrub, etc.), twine, long roots, wires, cables, and/or other similar elongated material. As previously mentioned, the material can wrap around the body portion 68 of the hub 60. Because the body portion 68 is tapered inwardly toward the cutting wheel 52, the material tends to wrap around the body portion 68 toward the first body end 70 and away from the motor 40. In doing so, the hub 60 operates to substantially prevent the material from interfering with the motor 40.

As the hub 60 and drive shaft 42 rotate, the material could collect around the body portion 68 of the hub 60 and at some point, the material may extend toward and even beyond the second body end 72 of the hub 60. The shearing feature 92, in the form of the edges 94 and/or apexes 100, 108, of the shearing device 86, 186, 286 operate to shear or cut the material extending toward or beyond the second body end 72. For instance, with each rotation of the hub 60, the material wrapped around the body portion 68 is nicked by the shearing feature 92. Further nicking of the material can be accomplished in instances where the material extends, at least slightly, into the cavities 106 of the shearing device 186, 286. Typically, nicking of the material prevents the buildup of material around the hub 60 that could adversely affect the operation of the rotational components and/or motor of the apparatus 10. In some instances, the material is nicked to the extent where the material brakes off and falls away from the hub 60. To this end, the hub 60 and the shearing device 86, 186, 286, either alone or in combination, protects the drive assembly 38 from undesirable material that may get wrapped around the hub 60 of apparatus 10.

The invention has been described in an illustrative manner, and it is be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. An apparatus for reducing plant material, said apparatus comprising:
    a frame defining a longitudinal axis;
    a boom having first and second boom ends with said first boom end coupled to said frame and said boom extending from said frame;
    a drive assembly at least partially coupled to said second boom end with said drive assembly having a drive shaft supported by said second boom end and rotatable relative to said boom about a rotational axis transverse to said longitudinal axis;
    a hub interconnected to and rotatable with said drive shaft;
    a cutting wheel interconnected to and rotatable with said hub about said rotational axis for reducing the plant material as said cutting wheel contacts the plant material; and
    a shearing device coupled to said second boom end with said shearing device having a working surface adjacent said hub with said working surface at least partially defining a shearing feature for shearing material wrapped around said hub as said hub rotates about said rotational axis.

2. The apparatus as set forth in claim 1 wherein said shearing device has an edge and said shearing feature is further defined as said edge.

3. The apparatus as set forth in claim 1 wherein said shearing device has a side transverse to said working surface with said side and said working surface meeting to form an edge, and said shearing feature is further defined as said edge.

4. The apparatus as set forth in claim 1 wherein said shearing device has a plurality of sides transverse to said working surface with one of said plurality of sides meeting another one of said plurality of sides to define an edge at an apex, and said shearing feature is further defined as said edge.

5. The apparatus as set forth in claim 4 wherein said plurality of sides meet at the apex having an angle of less than 90 degrees.

6. The apparatus as set forth in claim 1 wherein said working surface defines a plane and said shearing device has an edge aligned with said plane, and said shearing feature is further defined as said edge.

7. The apparatus as set forth in claim 1 wherein said working surface defines a plane and said shearing device has an edge transverse to said plane, and said shearing feature is further defined as said edge.

8. The apparatus as set forth in claim 7 wherein said edge is perpendicular to said plane of said working surface.

9. The apparatus as set forth in claim 1 wherein said working surface defines a plane and said shearing device has a plurality of edges including a first edge aligned with said plane and a second edge transverse to said plane, and said shearing feature is further defined as at least one of said first and second edges.

10. The apparatus as set forth in claim 9 wherein said first and second edges meet to form an apex, and said shearing feature is further defined as at least one of said first edge, said second edge, and said apex.

11. The apparatus as set forth in claim 1 wherein said working surface defines a plane and said shearing device has a plurality of edges including a first edge aligned with said plane and a third edge aligned with said plane with said first and third edges meeting to form an apex, and said shearing feature is further defined as said at least one of said first edge, said third edge, and said apex.

12. The apparatus as set forth in claim 1 wherein said shearing device has a plurality of edges spaced from one another, and said shearing feature is further defined as a combination of said plurality of edges.

13. The apparatus as set forth in claim 1 wherein said shearing device is further defined as a plurality of shearing devices.

14. The apparatus as set forth in claim 1 wherein said shearing device is further defined as a plurality of shearing devices arranged in a circular pattern about said rotational axis.

15. The apparatus as set forth in claim 14 wherein each shearing device of said plurality of shearing devices defines at least one edge with said at least one edge of one of said plurality of shearing devices being spaced from said at least one edge of another one of said plurality of shearing devices.

16. The apparatus as set forth in claim 1 wherein said shearing device has a side transverse to said working surface with said side having a primary side portion and at least one secondary side portion with said at least one secondary side portion defining a cavity and said primary side portion meeting said at least one secondary side portion to form an apex, and said shearing feature is further defined as at least one of said primary side portion, said secondary side portion, and said apex.

17. The apparatus as set forth in claim 1 wherein said shearing device has a side transverse to said working surface defining an aperture with said side having a primary side portion and at least one secondary side portion with said at least one secondary side portion defining a cavity open to said aperture and said primary side portion meeting said at least one secondary side portion to form an apex, and said shearing feature is further defined as at least one of said primary side portion, said secondary side portion, and said apex.

18. The apparatus as set forth in claim 17 wherein said aperture has a substantially circular configuration.

19. The apparatus as set forth in claim 17 wherein said cavity has a rounded configuration.

20. The apparatus as set forth in claim 17 wherein said cavity is one of a plurality of cavities with each one of said plurality of cavities equally spaced from an adjacent one of said plurality of cavities.

21. The apparatus as set forth in claim 20 wherein each cavity of said plurality of cavities has substantially the same configuration.

22. The apparatus as set forth in claim 1 wherein said hub has a flange abutting said cutting wheel to mount said cutting wheel to said hub, and said hub has a body portion having a first body end adjacent said flange and a second body end opposite said first body end, with said body portion tapered inwardly relative to said rotational axis toward said first body end adjacent said flange.

23. The apparatus as set forth in claim 22 wherein said hub further has a lip extending from said second body end of said body portion along said rotational axis, with said lip having a diameter that is smaller than a diameter of said body portion at said second body end.

24. The apparatus as set forth in claim 22 wherein said flange is integral with said body portion.

25. The apparatus as set forth in claim 1 wherein said drive assembly further includes a motor supported by said boom to power said drive shaft with said shearing feature adapted to minimize interference of the material with said motor.

26. An apparatus for reducing plant material, said apparatus comprising:
a frame defining a longitudinal axis;
a boom having first and second boom ends with said first boom end coupled to said frame and said boom extending from said frame;
a drive assembly at least partially coupled to said second boom end with said drive assembly including a drive shaft rotatable relative to said boom about a rotational axis transverse to said longitudinal axis;
a cutting wheel coupled to said drive shaft about said rotational axis for reducing the plant material as said cutting wheel contacts the plant material; and
a hub interconnected between said cutting wheel and said drive shaft with said hub rotatable with said drive shaft, said hub having a flange abutting said cutting wheel to mount said cutting wheel to said hub and a body portion having a first body end adjacent said flange and a second body end opposite said first body end with said body portion tapered inwardly toward said first body end adjacent said flange relative to said rotational axis, with a diameter of said flange being larger than a diameter of said body portion at said first body end to direct the material toward said cutting wheel; and with said diameter of said body portion at said first body end being smaller than a diameter of said body portion at said second body end.

27. The apparatus as set forth in claim 26 further comprising a shearing device coupled to said second boom end with said shearing device having a working surface adjacent said body portion of said hub, with said working surface at least partially defining a shearing feature for shearing material wrapped around said body portion of said hub as said hub rotates about said rotational axis.

28. The apparatus as set forth in claim 27 wherein said drive assembly further includes a motor supported by said boom to power said drive shaft with said shearing feature of said shearing device adapted to minimize interference of the material with said motor.

29. The apparatus as set forth in claim 28 further comprising a coupler disposed between said hub and said drive shaft to interconnect said hub and said drive shaft.

30. The apparatus as set forth in claim 29 wherein said hub has an inner hub surface and said coupler has inner and outer coupler surfaces, with said inner coupler surface engaging said drive shaft and said outer coupler surface engaging said inner hub surface.

* * * * *